United States Patent
Fan et al.

(10) Patent No.: US 12,366,884 B2
(45) Date of Patent: Jul. 22, 2025

(54) CLOCK SYNCHRONIZATION APPARATUS AND METHOD, QUANTUM MEASUREMENT AND CONTROL SYSTEM, AND QUANTUM COMPUTER

(71) Applicant: Origin Quantum Computing Technology (Hefei) Co., Ltd, Hefei (CN)

(72) Inventors: Liangchen Fan, Hefei (CN); Xuebai Li, Hefei (CN); Weicheng Kong, Hefei (CN)

(73) Assignee: Origin Quantum Computing Technology (Hefei) Co., Ltd, Hefei (CN)

(*) Notice: Subject to any disclaimer, the term of this patent is extended or adjusted under 35 U.S.C. 154(b) by 66 days.

(21) Appl. No.: 18/432,958

(22) Filed: Feb. 5, 2024

(65) Prior Publication Data
US 2024/0176386 A1    May 30, 2024

Related U.S. Application Data

(63) Continuation of application No. PCT/CN2022/133210, filed on Nov. 21, 2022.

(30) Foreign Application Priority Data

Nov. 26, 2021   (CN) .......................... 202111418741.8

(51) Int. Cl.
*G06F 1/12*   (2006.01)
*G06F 1/08*   (2006.01)

(52) U.S. Cl.
CPC . *G06F 1/12* (2013.01); *G06F 1/08* (2013.01)

(58) Field of Classification Search
CPC ................................. G06F 1/32; G06F 9/44
See application file for complete search history.

(56) References Cited

U.S. PATENT DOCUMENTS

| | | | |
|---|---|---|---|
| 6,262,940 B1* | 7/2001 | Choi | G11C 7/222 |
| | | | 365/230.03 |
| 2011/0239031 A1* | 9/2011 | Ware | G06F 13/1689 |
| | | | 713/500 |
| 2012/0054517 A1* | 3/2012 | Fuh | G06F 1/3287 |
| | | | 713/320 |

* cited by examiner

*Primary Examiner* — Keshab R Pandey
(74) *Attorney, Agent, or Firm* — Westbridge IP LLC

(57) ABSTRACT

Disclosed are a clock synchronization apparatus, a clock synchronization method, a quantum measurement and control system, and a quantum computer. The clock synchronization apparatus includes a benchmark clock, a first clock generator, function boards, and second clock generators. The first clock generator is in a communication connection to the second clock generators, and one corresponding second clock generator is disposed on each of the function boards. The benchmark clock provides a first benchmark clock signal to the first clock generator providing a synchronization signal used to synchronize output clocks of all the second clock generators to the second clock generators based on the first benchmark clock signal. The second clock generators output, based on the synchronization signal, a work clock signal required by the function boards. The plurality of function boards generate, based on the work clock signal, a first signal required to perform corresponding work by using qubits.

20 Claims, 1 Drawing Sheet

CLOCK SYNCHRONIZATION APPARATUS AND METHOD, QUANTUM MEASUREMENT AND CONTROL SYSTEM, AND QUANTUM COMPUTER

CROSS-REFERENCE TO RELATED APPLICATIONS

This application is a continuation of International Application No. PCT/CN2022/133210, filed on Nov. 21, 2022, which claims priority to Chinese Patent Application No. 202111418741.8, filed with the China National Intellectual Property Administration on Nov. 26, 2021 and entitled "CLOCK SYNCHRONIZATION APPARATUS AND METHOD, QUANTUM MEASUREMENT AND CONTROL SYSTEM, AND QUANTUM COMPUTER". The disclosures of the aforementioned applications are hereby incorporated by reference in their entireties.

TECHNICAL FIELD

This application relates to the technical field of quantum measurement and control, and in particular, to a clock synchronization apparatus, a clock synchronization method, a quantum measurement and control system, and a quantum computer.

BACKGROUND

A quantum chip is a core component for running quantum computing. A plurality of qubits are integrated on the quantum chip. To ensure normal operation of the qubits, a special quantum measurement and control system needs to be built. A plurality of signal modules are disposed in the quantum measurement and control system to provide various control signals for each qubit, such as a frequency control signal and a quantum state control signal. When a quantum computing task is run on the quantum chip, the frequency control signal and the quantum state control signal need to be first loaded into the qubit for running computing. For an operation result, a read signal further needs to be loaded for reading the operation result. In a process of controlling and reading the qubit, various signals loaded have corresponding time sequences, and the time sequence of each signal is determined based on a built-in clock of a respective signal source. As the quantum technologies develop, quantum computing tasks that are run on quantum chips become more complex, and corresponding function modules in the quantum measurement and control system become more complex, thereby making it difficult to ensure clock synchronization of various function modules for outputting a signal.

Therefore, how to ensure clock synchronization of the various function modules in the quantum measurement and control system becomes a technical problem to be urgently resolved in the field.

SUMMARY

An objective of this application is to provide a clock synchronization apparatus, a clock synchronization method, a quantum measurement and control system, and a quantum computer, to ensure clock synchronization of various function modules in the quantum measurement and control system.

To implement the foregoing objective, this application provides a clock synchronization apparatus, including a benchmark clock, a first clock generator, a plurality of function boards, and second clock generators having a same quantity as the function boards, where the first clock generator is in a communication connection to the second clock generators, the first clock generator comprises a first phase-lock loop circuit, and one corresponding second clock generator is disposed on each of the function boards; the benchmark clock is configured to provide a first benchmark clock signal to the first clock generator; the first clock generator is configured to provide a synchronization signal to all the second clock generators based on the first benchmark clock signal, where the synchronization signal is used to synchronize output clocks of all the second clock generators; the second clock generators are configured to output, based on the synchronization signal, a work clock signal required by the function boards; and the function boards are configured to generate, based on the work clock signal, a first signal required to perform corresponding work by using qubits.

Optionally, the synchronization signal includes a trigger signal, and the trigger signal is used to configure a same initial clock value for all the second clock generators.

Optionally, the synchronization signal further includes a synchronization reference signal, and the synchronization reference signal is used as a reference clock for all the second clock generators.

Optionally, the synchronization signal further includes a second benchmark clock signal, and the second benchmark clock signal is used as an input clock of all the second clock generators.

Optionally, the first phase-lock loop circuit is used to lock the first benchmark clock signal and generate a first locking signal after locking the first benchmark clock signal, and the first clock generator outputs the synchronization reference signal based on the first locking signal.

Optionally, each of the second clock generators includes a second phase-lock loop circuit; and the second phase-lock loop circuit is used to lock the trigger signal and generate a second locking signal after locking the trigger signal, and the second clock generator outputs, based on the second locking signal, the work clock signal required by the function boards.

Optionally, the clock synchronization apparatus further includes a server, and the server bidirectionally communicates with the first clock generator and the second clock generators; and the server is configured to: receive a first clock configuration file of the first clock generator and a second clock configuration file of the second clock generators, configure the first clock configuration file and the second clock configuration file, and distribute the first clock configuration file and the second clock configuration file to the first clock generator and the second clock generators.

Optionally, the clock synchronization apparatus further includes a data processing device and a routing device, and the server bidirectionally communicates with the first clock generator and the second clock generators by using the data processing device and the routing device.

Optionally, the benchmark clock includes an atomic clock.

Based on a same inventive concept, this application further provides a clock synchronization method, including: providing, by a benchmark clock, a first benchmark clock signal to a first clock generator; providing, by the first clock generator, a synchronization signal to all second clock generators based on the first benchmark clock signal, where the synchronization signal is used to synchronize output clocks of all the second clock generators; outputting, by the second clock generators based on the synchronization signal, a work clock signal required by the function boards; and generating, by the function boards based on the work clock signal, a first signal required to perform corresponding work by using qubits.

Optionally, the synchronization signal further comprises a synchronization reference signal, and the method further includes: locking, by a first phase-lock loop circuit of the first clock generator, the first benchmark clock signal, and generating a first locking signal after locking the first benchmark clock signal; and outputting, by the first clock generator, the synchronization reference signal based on the first locking signal.

Optionally, the synchronization signal includes a trigger signal, and the trigger signal is used to configure a same initial clock value for all the second clock generators; and the clock synchronization method further includes: locking, by a second phase-lock loop circuit of the second clock generator, the trigger signal, and generating a second locking signal after locking the trigger signal; and outputting, by the second clock generator based on the second locking signal, the work clock signal required by the function boards.

Optionally, the clock synchronization method further includes: configuring, by a server, a first clock configuration file of the first clock generator, and sending the first clock configuration file to the first clock generator.

Optionally, the clock synchronization method further includes: configuring, by the server, a second clock configuration file of the second clock generators, and sending the second clock configuration file to the second clock generators.

Based on a same inventive concept, this application further provides a quantum measurement and control system, including the clock synchronization apparatus according to any one of the foregoing feature descriptions, or the clock synchronization method according to any one of the foregoing feature descriptions.

Based on a same inventive concept, this application further provides a quantum computer, including the quantum measurement and control system in the foregoing feature descriptions.

Based on a same inventive concept, this application further provides a non-transitory computer-readable storage medium, where the non-transitory computer-readable storage medium stores a computer program, and when the computer program is executed by a processor, the clock synchronization method according to any one of the foregoing feature descriptions can be implemented.

Compared with the conventional technologies, this application has the following beneficial effects.

The clock synchronization apparatus provided in this application includes a benchmark clock, a first clock generator, a plurality of function boards, and second clock generators having a same quantity as the function boards. The first clock generator is in a communication connection to the second clock generators, and one corresponding second clock generator is disposed on each of the function boards. The benchmark clock provides the first benchmark clock signal to the first clock generator, the first clock generator provides the synchronization signal to all the second clock generators based on the first benchmark clock signal, and the synchronization signal is used to synchronize the output clocks of all the second clock generators. The second clock generators output, based on the synchronization signal, a work clock signal required by the function boards. The function boards generate, based on the work clock signal, the first signal required to perform corresponding work by using qubits. Based on this, clock synchronization of the various function boards can be effectively ensured.

The clock synchronization method, the quantum measurement and control system, the quantum computer, and the non-transitory computer-readable storage medium that are provided in this application belong to the same inventive concept, and therefore, have a same beneficial effect. Details are not described herein again.

DETAILED DESCRIPTION OF THE EMBODIMENTS

The following describes specific implementations of this application with reference to the accompanying drawings. The advantages and features of this application are more apparent based on the following descriptions and claims. It should be noted that, the accompanying drawings all use a very simplified form and a non-accurate proportion for conveniently and clearly assisting in description of the embodiments of this application.

In the descriptions of this application, it should be understood that, orientations or position relationships indicated by the terms "center", "on", "below", "left", "right", and the like are orientations or position relationships based on the accompanying drawings. These terms are merely intended to facilitate the description of this application and simplify the description, rather than indicating or implying that the referred apparatus or element must have a particular orientation or be constructed and operated in a particular orientation. Therefore, these terms should not be interpreted as limiting this application.

In addition, the terms "first", "second", and the like are merely intended for a purpose of description, and shall not be understood as an indication or implication of relative importance or implicit indication of the number of indicated technical features. Therefore, the features defined by "first", "second", and the like may indicate or imply that one or more of the features are included. In the descriptions of this application, "a plurality of" means at least two, for example, two or three, unless otherwise specifically stated.

Figure 1:
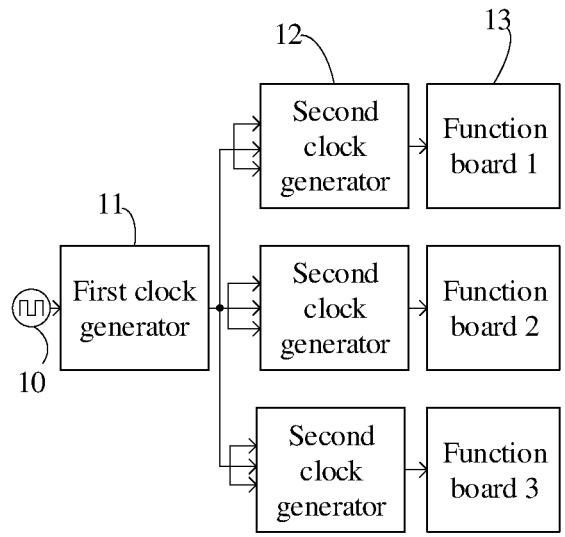
FIG. 1 is a schematic diagram of a structure of a clock synchronization apparatus according to an embodiment of this application.
Figure 2:
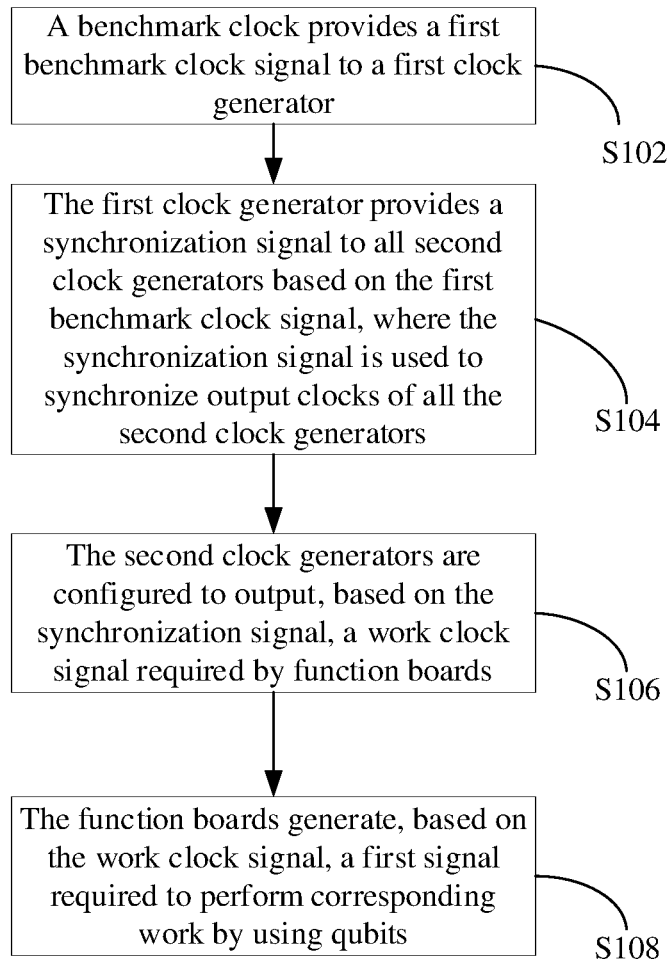
FIG. 2 is a schematic flowchart of a clock synchronization method according to an embodiment of this application.

As shown in FIG. 1, an embodiment of this application provides a clock synchronization apparatus, including a benchmark clock 10, a first clock generator 11, a plurality of function boards 13, and second clock generators 12 having a same quantity as the function boards 13. The first clock generator 11 is in a communication connection to the second clock generators 12, and one corresponding second clock generator 12 is disposed on each of the function boards 13. The benchmark clock 10 is configured to provide a first benchmark clock signal to the first clock generator 11. The first clock generator 11 is configured to provide a synchronization signal to all the second clock generators 12 based on the first benchmark clock signal. The synchronization signal is used to synchronize output clocks of all the second clock generators 12. The second clock generators 12 are configured to output, based on the synchronization signal, a work clock signal required by the function boards 13. The plurality of function boards 13 are configured to generate, based on the work clock signal, a first signal required to perform corresponding work by using qubits.

Different from the conventional technologies, the clock synchronization apparatus provided in this embodiment of this application includes the benchmark clock 10, the first clock generator 11, the plurality of function boards 13, and the second clock generators 12 having the same quantity as the function boards 13. The first clock generator 11 is in a communication connection to the second clock generators 12, and the one corresponding second clock generator 12 is disposed on each of the function boards 13. The benchmark clock 10 provides the first benchmark clock signal to the first clock generator 11, the first clock generator 11 provides the synchronization signal to all the second clock generators 12 based on the benchmark clock signal 10, and the synchronization signal is used to synchronize the output clocks of all the second clock generators 12. The second clock generators 12 output, based on the synchronization signal, the work clock signal required by the function boards 13. The function boards 13 generate, based on the work clock signal, the first signal required to perform corresponding work by using qubits. Based on this, clock synchronization between the various function boards 13 can be effectively ensured.

It should be noted that the benchmark clock 10 provided in this embodiment may be an atomic clock. The atomic clock is a very high-precision timing apparatus. There are a plurality of types of atomic clocks, such as a cesium atomic clock, a hydrogen atomic clock, a rubidium atomic clock, and a coherent population trapping (Coherent Population Trapping, CPT) atomic clock. In this embodiment, the benchmark clock 10 is preferably a rubidium atomic clock. In another embodiment, other types of atomic clocks may further be selected. This is not limited herein and selection may be performed according to actual needs. In addition, in this embodiment, the first clock generator 11 and the second clock generator 12 are devices configured to generate a clock signal, and the function board 13 synchronously performs an operation with the generated clock signal. The first clock generator 11 and the second clock generator 12 may be clock generators of a same type or of different types. For example, both the first clock generator 11 and the second clock generator 12 are HMC7044. Alternatively, the first clock generator 11 may be HMC7044, and the second clock generator 12 may be HMC7043. There are many other combinations that not be described one by one herein. Specific selection may be performed based on actual needs. To facilitate description of the technical solutions of this application, in this embodiment, both the first clock generator 11 and the second clock generator 12 use HMC7044. When the first clock generator 11 and the second generator are other devices, a specific solution may be implemented with reference to HMC7044. This is not limited herein.

A person skilled in the art may understand that in this embodiment, the plurality of function boards 13 are configured to generate the first signal required to perform corresponding work by using qubits, and the first signal is not one signal, but a series of signals. The first signal includes but is not limited to a frequency control signal and a quantum state control signal that are applied to the qubits when a quantum computing task is run, and a read signal applied when an operation result is obtained, to read the operation result.

Specifically, the synchronization signal includes a trigger signal, a synchronization reference signal, and a second benchmark clock signal. The trigger signal is used to configure a same initial clock value for all the second clock generators 12, the synchronization reference signal is used as a reference clock of all the second clock generators 12, and the second benchmark clock signal is used as input clocks of all the second clock generators 12.

Optionally, the first clock generator 11 includes a first phase-lock loop circuit, the first phase-lock loop circuit is used to lock the first benchmark clock signal and generate a first locking signal after locking the first benchmark clock signal, and the first clock generator 11 outputs the synchronization reference signal based on the first locking signal. The first phase-lock loop circuit may ensure phase synchronization of the first benchmark clock signals.

Optionally, each of the second clock generators 12 includes a second phase-lock loop circuit, the second phase-lock loop circuit is used to lock the trigger signal and generate a second locking signal after locking the trigger signal, and the second clock generator 12 outputs, based on the second locking signal, the work clock signal required by the function boards. The second phase-lock loop circuit may ensure phase synchronization of the synchronization signals. It should be noted that in this embodiment, the second phase-lock loop circuit includes a first-level phase-lock loop subcircuit and a second-level phase-lock loop subcircuit. The first-level phase-lock loop subcircuit is used to clean up a synchronization error of multi-channel, a jitter, and phase noise.

In addition, a person skilled in the art should understand that the first phase-lock loop circuit and the second phase-lock loop circuit have a usage restriction, that is, a output clock of the clock generators needs to be in an integer multiple relationship with the input clock. When there are many objects to be synchronized by the clock generators, the input clock needs to be determined by the greatest common divisor of all output clock frequencies.

Optionally, the clock synchronization apparatus further includes a server, and the server bidirectionally communicates with the first clock generator and the second clock generators. The server is configured to: receive a first clock configuration file of the first clock generator 11 and a second clock configuration file of the second clock generators 12, configure the first clock configuration file and the second clock configuration file, and distribute the first clock configuration file and the second clock configuration file to the first clock generator 11 and the second clock generators 12. The server uniformly configures the clock configuration files of the clock generators, so that clock synchronization between the function boards 13 connected to the second clock generators 12 is ensured.

Specifically, the clock synchronization apparatus further includes a data processing device and a routing device, and the server bidirectionally communicates with the first clock generator 11 and the second clock generators 12 by using the data processing device and the routing device. The data processing device is configured to process and forward data of the first clock configuration file and data of the second clock configuration file, so that the first clock configuration file and the second clock configuration file can be communicated among the server, the first clock generator 11, and the second clock generators 12. The routing device plays a role of routing and forwarding. A person skilled in the art can understand that the data processing device is an intelligent device with a data processing capability, and for example, may be a field programmable gate array (Field Programmable Gate Array, FPGA), an microcontroller unit (Microcontroller Unit, MCU), an microprocessor unit (Microprocessor Unit, MPU), or a digital signal processor (Digital Signal Processor, DSP). In this embodiment, the data processing device is preferably an FPGA. In this embodiment, the server uniformly configures clocks of the first clock generator 11 and the second clock generators 12. The clock configuration files of the first clock generator 11 and the second clock generators 12 can be transmitted to the FPGA through a serial peripheral interface (Serial Peripheral Interface, SPI) bus, be transmitted to the routing device through an Aurora line, and be transmitted to the server through the Ethernet. The server uniformly configures the clock configuration file for each of clock generators, to ensure clock synchronization between the function boards 13. A person skilled in the art can understand that in another embodiment, a transmission manner between the first clock generator 11 and the FPGA and between the second clock generator 12 and the FPGA is not limited to using the SPI bus, and may further be in another form. For example, an inter-integrated circuit (Inter-Integrated Circuit, I2C) or a universal asynchronous receiver/transmitter (Universal Asynchronous Receiver/Transmitter, UART) may be selected. This is not limited herein. However, it should be noted that a different communication protocol needs to be correspondingly adjusted when a different transmission manner is selected. For example, when the SPI bus is used, an SPI communication protocol needs to be followed. When an I2C bus is used, an I2C communication protocol needs to be followed. This is not described herein.

Based on a same inventive concept, an embodiment further provides a clock synchronization method, including the following steps.

S102: A benchmark clock provides a first benchmark clock signal to a first clock generator.

S104: The first clock generator provides a synchronization signal to all second clock generators based on the first benchmark clock signal, where the synchronization signal is used to synchronize output clocks of all the second clock generators.

S106: The second clock generators output, based on the synchronization signal, a work clock signal required by function boards.

S108: The function boards generate, based on the work clock signal, a first signal required to perform corresponding work by using qubits.

Optionally, the synchronization signal includes a trigger signal, and the trigger signal is used to configure a same initial clock value for all the second clocks.

The method further includes: locking, by a first phase-lock loop circuit of the first clock generator, the first benchmark clock signal, and generating a first locking signal after locking the first benchmark clock signal; and outputting, by the first clock generator, the synchronization signal based on the first locking signal.

Optionally, the synchronization signal includes a trigger signal, and the trigger signal is used to configure a same initial clock value for all the second clock generators.

The clock synchronization method further includes: locking, by a second phase-lock loop circuit for each of the second clock generators, the trigger signal, and generating a second locking signal after locking the trigger signal; and outputting, by the second clock generator based on the second locking signal, the work clock signal required by the function boards.

Optionally, the clock synchronization method further includes: configuring, by a server, a first clock configuration file of the first clock generator, and sending the first clock configuration file to the first clock generator.

Optionally, the clock synchronization method further includes: configuring, by the server, a second clock configuration file of the second clock generators, and sending the second clock configuration file to the second clock generators.

In this embodiment, the clock synchronization method and the clock synchronization apparatus belong to the same inventive concept, and therefore have a same beneficial effect. This is not described herein again.

Based on a same inventive concept, an embodiment further provides a quantum measurement and control system, including the clock synchronization apparatus according to any one of the foregoing feature descriptions, or the clock synchronization method according to any one of the foregoing feature descriptions.

Based on a same inventive concept, an embodiment further provides a quantum computer, including the quantum measurement and control system.

Based on a same inventive concept, an embodiment further provides a non-transitory computer-readable storage medium, where the non-transitory computer-readable storage medium stores a computer program, and when the computer program is executed by a processor, the clock synchronization method according to any one of the foregoing feature descriptions can be implemented.

The non-transitory computer-readable storage medium may be a tangible device that can maintain and store instructions used by an instruction execution device, such as, but not limited to, an electrical storage device, a magnetic storage device, an optical storage device, an electromagnetic storage device, a semiconductor storage device, or any suitable combination thereof. More specific examples (a non-exhaustive list) of the readable storage media include: a portable computer disk, a hard disk, a random access memory (RAM), a read only memory (ROM), an erasable programmable read only memory (EPROM or a flash memory), a static random access memory (SRAM), a compact disk read only memory (CD-ROM), a digital versatile disk (DVD), a memory stick, a floppy disk, a mechanically encoding device, such as a punched card on which instructions are stored or a protruding structure in a groove, and any suitable combination thereof. The computer program described herein may be downloaded from a non-transitory computer-readable storage medium to various computing/processing devices, or to an external computer or external storage device over a network, such as the Internet, a local area network, a wide area network, and/or a wireless network. The network may include a copper transmission cable, an optical fiber transmission, a router, a firewall, a switch, a gateway computer, and/or an edge server. A network adapter card or network interface in each computing/processing device receives the computer program from the network and forwards the computer program for storage in the non-transitory computer-readable storage medium in a respective computing/processing device. The computer program used to perform the operations of this application may be an assembly instruction, an instruction set architecture (ISA) instruction, a machine instruction, a machine-related instruction, microcode, a firmware instruction, a state setting data, or source code or target code compiled by using one or more programming languages. The programming languages include object-oriented programming languages, such as Smalltalk, C++, and a conventional procedural programming language, such as a "C" language or a similar programming language. The computer program may be executed entirely on a user computer, or some may be executed on a user computer as a separate software package, or some may be executed on a user computer while some is executed on a remote computer, or the computer program may be entirely executed on a remote computer or a server. When a remote computer is used, the remote computer may be connected to a user computer by using any type of network, including a local area network (LAN) or a wide area network (WAN), or may be connected to an external computer (for example, connected by using an Internet service provider through the Internet). In some embodiments, state information from the computer program is used to personalize an electronic circuit, such as a programmable logic circuit, a field programmable gate array (FPGA), or a programmable logic array (PLA), that can execute a computer readable program instruction, to implement various aspects of this application.

Herein, aspects of this application are described with reference to a flowchart and/or a block diagram of a method, a system, and a computer program product according to the embodiments of this application. It should be understood that each block in the flowchart and/or block diagram and a combination of blocks in the flowchart and/or block diagram may be implemented by the computer program. The computer programs may be provided to a processor of a general-purpose computer, a dedicated computer, or another programmable data processing apparatus, to generate a machine, so that when the programs are executed by the processor of the computer or programmable data processing apparatus, an apparatus for implementing a function/action specified in one or more blocks in the flowcharts and/or block diagrams is generated. Alternatively, the computer programs may be stored in readable storage media. The computer programs enable a computer, a programmable data processing apparatus, and/or another device to work in a specific manner. Therefore, the non-transitory computer-readable storage medium storing the computer program includes an article of manufacture that includes instructions for implementing various aspects of the function/act specified in one or more blocks of the flowcharts and/or block diagrams.

Alternatively, the computer programs may be loaded onto a computer, another programmable data processing apparatus, or another device, so that a series of operation steps are performed on the computer, another programmable data processing apparatus, or the another device, to generate a computer-implemented process. In this case, the computer program executed on the computer, another programmable data processing apparatus, or the another device implements the function/act specified in one or more blocks of the flowcharts and/or block diagrams.

In the descriptions of this specification, descriptions with reference to the terms "an embodiment", "some embodiments", "an example", "a specific example", or the like means that specific features, structures, materials, or characteristics described in combination with the embodiments or examples are included in at least one embodiment or example of this application. In this specification, the schematic representation of the foregoing terms does not necessarily refer to a same embodiment or example. Moreover, the described specific features, structures, materials, or characteristics may be combined in any one or more embodiments in an appropriate manner. In addition, different embodiments or examples described in this specification may be combined and grouped by a person skilled in the art.

The foregoing are merely preferred embodiments of this application, and have no limitation to this application. Any variation, such as equivalent replacement or modification, made by a person skilled in the art to the technical solutions and technical content disclosed in this application without departing from the scope of the technical solutions of this application shall belong to content of the technical solutions of this application and still belong to the protection scope of this application.

What is claimed is:

1. A clock synchronization apparatus, comprising a benchmark clock, a first clock generator, a plurality of function boards, and second clock generators having a same quantity as the function boards, wherein the first clock generator is in a communication connection to the second clock generators, and one corresponding second clock generator is disposed on each of the function boards;
    the benchmark clock is configured to provide a first benchmark clock signal to the first clock generator;
    the first clock generator is configured to provide a synchronization signal to all the second clock generators based on the first benchmark clock signal, wherein the synchronization signal is used to synchronize output clocks of all the second clock generators, the first clock generator comprises a first phase-lock loop circuit;
    the second clock generators are configured to output, based on the synchronization signal, a work clock signal required by the function boards; and
    the function boards are configured to generate, based on the work clock signal, a first signal required to perform corresponding work by using qubits.

2. The clock synchronization apparatus according to claim 1, wherein the synchronization signal comprises a trigger signal, and the trigger signal is used to configure a same initial clock value for all the second clock generators.

3. The clock synchronization apparatus according to claim 2, wherein the synchronization signal further comprises a synchronization reference signal, and the synchronization reference signal is used as a reference clock for all the second clock generators.

4. The clock synchronization apparatus according to claim 3, wherein the synchronization signal further comprises a second benchmark clock signal, and the second benchmark clock signal is used as an input clock of all the second clock generators.

5. The clock synchronization apparatus according to claim 1, wherein the first phase-lock loop circuit is used to lock the first benchmark clock signal and generate a first locking signal after locking the first benchmark clock signal, and the first clock generator outputs the synchronization reference signal based on the first locking signal.

6. The clock synchronization apparatus according to claim 4, wherein each of the second clock generators comprises a second phase-lock loop circuit; and
    the second phase-lock loop circuit is used to lock the trigger signal and generate a second locking signal after locking the trigger signal, and the second clock generator outputs, based on the second locking signal, the work clock signal required by the function boards.

7. The clock synchronization apparatus according to claim 1, wherein the clock synchronization apparatus further comprises a server, and the server bidirectionally communicates with the first clock generator and the second clock generators; and
    the server is configured to: receive a first clock configuration file of the first clock generator and a second clock configuration file of the second clock generators, configure the first clock configuration file and the second clock configuration file, and distribute the first clock configuration file and the second clock configuration file to the first clock generator and the second clock generators.

8. The clock synchronization apparatus according to claim 7, wherein the clock synchronization apparatus further comprises a data processing device and a routing device, and the server bidirectionally communicates with the first clock generator and the second clock generators by using the data processing device and the routing device.

9. The clock synchronization apparatus according to claim 1, wherein the benchmark clock comprises an atomic clock.

10. The clock synchronization apparatus according to claim 1, wherein the first signal is a frequency control signal, a quantum state control signal, or a read signal.

11. The clock synchronization apparatus according to claim 6, wherein the second phase-lock loop circuit comprises a first-level phase-lock loop subcircuit and a second-level phase-lock loop subcircuit.

12. The clock synchronization apparatus according to claim 8, wherein the data processing device is a field programmable gate array, a microcontroller unit, a microprocessor unit, or a digital signal processor.

13. A clock synchronization method, comprising:
providing, by a benchmark clock, a first benchmark clock signal to a first clock generator;
providing, by the first clock generator, a synchronization signal to all second clock generators based on the first benchmark clock signal, wherein the synchronization signal is used to synchronize output clocks of all the second clock generators;
outputting, by the second clock generators based on the synchronization signal, a work clock signal required by function boards; and
generating, by the function boards based on the work clock signal, a first signal required to perform corresponding work by using qubits.

14. The clock synchronization method according to claim 13, wherein the synchronization signal further comprises a synchronization reference signal, the method further comprises:
locking, by a first phase-lock loop circuit of the first clock generator, the first benchmark clock signal, and generating a first locking signal after locking the first benchmark clock signal; and
outputting, by the first clock generator, the synchronization reference signal based on the first locking signal.

15. The clock synchronization method according to claim 13, wherein the synchronization signal comprises a trigger signal, and the trigger signal is used to configure a same initial clock value for all the second clock generators; and
the clock synchronization method further comprises:
locking, by a second phase-lock loop circuit for each of the second clock generators, the trigger signal, and generating a second locking signal after locking the trigger signal; and
outputting, by the second clock generator based on the second locking signal, the work clock signal required by the function boards.

16. The clock synchronization method according to claim 13, wherein the clock synchronization method further comprises:
configuring, by a server, a first clock configuration file of the first clock generator, and sending the first clock configuration file to the first clock generator.

17. The clock synchronization method according to claim 13, wherein the clock synchronization method further comprises:
configuring, by the server, a second clock configuration file of the second clock generators, and sending the second clock configuration file to the second clock generators.

18. A non-transitory computer-readable storage medium, wherein the non-transitory computer-readable storage medium stores a computer program, and when the computer program is executed by a processor, the clock synchronization method according to claim 13 is implemented.

19. A quantum measurement and control system, comprising a clock synchronization apparatus, wherein the clock synchronization apparatus comprises a benchmark clock, a first clock generator, a plurality of function boards, and second clock generators having a same quantity as the function boards, the first clock generator is in a communication connection to the second clock generators, and one corresponding second clock generator is disposed on each of the function boards;
the benchmark clock is configured to provide a first benchmark clock signal to the first clock generator;
the first clock generator is configured to provide a synchronization signal to all the second clock generators based on the first benchmark clock signal, wherein the synchronization signal is used to synchronize output clocks of all the second clock generators, the first clock generator comprises a first phase-lock loop circuit;
the second clock generators are configured to output, based on the synchronization signal, a work clock signal required by the function boards; and
the function boards are configured to generate, based on the work clock signal, a first signal required to perform corresponding work by using qubits.

20. A quantum computer, comprising the quantum measurement and control system according to claim 19.

* * * * *